(12) United States Patent
Hu et al.

(10) Patent No.: US 12,472,419 B2
(45) Date of Patent: Nov. 18, 2025

(54) AUTOMATIC REAL-TIME BASKETBALL BOX SCORE RECORDING AND ANALYSIS SYSTEM WITH VIDEOS CAPTURED FROM ARBITRARY ANGLES AND METHOD THEREOF

(71) Applicant: NeuinX CO., LTD., Kaohsiung (TW)

(72) Inventors: Min-Chun Hu, Hsinchu (TW);
Hung-Kuo Chu, Hsinchu (TW);
Tsung-Hsun Tsai, Hsinchu (TW);
Chen-Ni Chen, Hsinchu (TW);
Ting-Yang Kao, Hsinchu (TW); Tse-Yu Pan, Hsinchu (TW)

(73) Assignee: NeuinX CO., LTD., Kaohsiung (TW)

(*) Notice: Subject to any disclaimer, the term of this patent is extended or adjusted under 35 U.S.C. 154(b) by 307 days.

(21) Appl. No.: 18/299,065

(22) Filed: Apr. 12, 2023

(65) Prior Publication Data

US 2024/0216781 A1   Jul. 4, 2024

(30) Foreign Application Priority Data

Dec. 30, 2022   (TW) ................... 111150960

(51) Int. Cl.
*A63F 13/812* (2014.01)
*A63B 24/00* (2006.01)
(Continued)

(52) U.S. Cl.
CPC ...... *A63B 71/0605* (2013.01); *A63B 24/0062* (2013.01); *A63B 71/0622* (2013.01); *A63B 71/0669* (2013.01); *G06V 20/44* (2022.01); *A63B 2220/05* (2013.01); *A63B 2220/806* (2013.01); *A63B 2230/62* (2013.01); *A63B 2243/0037* (2013.01)

(58) Field of Classification Search
None
See application file for complete search history.

(56) References Cited

U.S. PATENT DOCUMENTS

| 9,589,207 B2 * | 3/2017 | Holohan | G06V 40/23 |
| 11,694,358 B2 * | 7/2023 | Dassa | H04N 21/44008 |
| | | | 382/103 |

(Continued)

FOREIGN PATENT DOCUMENTS

| CN | 111167099 A | 5/2020 |
| CN | 114827478 A | 7/2022 |

*Primary Examiner* — Sunit Pandya
(74) *Attorney, Agent, or Firm* — CKC & Partners Co., LLC (57) ABSTRACT

An automatic real-time basketball box score recording and analysis system with videos captured from arbitrary angles is applied to a basketball game. A shot analyzing step is performed to analyze the videos to determine whether one of the videos is a real shot event to generate a shot analysis result. A data calculating step is performed to analyze the videos to determine that the real shot event is a three-point shot, a two-point shot or a free throw to generate a scoring result, and then calculate a game data according to the shot analysis result and the scoring result. A player analyzing step is performed to analyze the videos to obtain a posture analysis data of a shooter. The posture analysis data is configured to evaluate a performance of the shooter when shooting. An interface device is configured to modify and display the game data.

18 Claims, 7 Drawing Sheets

(51) Int. Cl.
*A63B 71/06* (2006.01)
*G06V 20/40* (2022.01)

(56) References Cited

U.S. PATENT DOCUMENTS

| | | | | |
|---|---|---|---|---|
| 2016/0279498 | A1* | 9/2016 | Gordon | A63B 71/0619 |
| 2017/0154222 | A1* | 6/2017 | Zakaluk | G06T 7/277 |
| 2018/0218243 | A1* | 8/2018 | Felsen | G06N 7/01 |
| 2019/0087661 | A1* | 3/2019 | Lee | G06V 10/82 |
| 2019/0114485 | A1* | 4/2019 | Chan | H04N 21/4662 |
| 2020/0043287 | A1* | 2/2020 | Zhang | G06V 40/103 |
| 2021/0397846 | A1 | 12/2021 | Chang et al. | |

\* cited by examiner

| Team 1 Name | | | | 20 | Event list | 20:35 | 15 | Team 2 Name | | |
|---|---|---|---|---|---|---|---|---|---|---|
| | Hit | Shot | Hit ratio | | | | | | Hit | Shot | Hit ratio |

| | Hit | Shot | Hit ratio |
|---|---|---|---|
| Two-point shot | 2 | 5 | 40% |
| Three-point shot | 3 | 5 | 60% |
| Free throw | 3 | 7 | 43% |
| Dunk | 2 | 2 | 100% |

| Defensive rebound | 1 | | Offensive rebound | 2 |
|---|---|---|---|---|
| Steal | 1 | | Team two fouls | |
| Turnover | 1 | | Five run | |
| Foul | 4 | | Seven run | |
| Assist | 5 | | Team three fouls | |
| Block shot | 2 | | Team four fouls | |

| | Hit | Shot | Hit ratio |
|---|---|---|---|
| Two-point shot | 3 | 5 | 60% |
| Three-point shot | 1 | 5 | 20% |
| Free throw | 4 | 8 | 50% |
| Dunk | 1 | 1 | 100% |

| Defensive rebound | 0 | | Offensive rebound | 2 |
|---|---|---|---|---|
| Steal | 1 | | Team two fouls | |
| Turnover | 3 | | Five run | |
| Foul | 3 | | Team three fouls | |
| Assist | 1 | | Seven run | |
| Block shot | 0 | | | |

AUTOMATIC REAL-TIME BASKETBALL BOX SCORE RECORDING AND ANALYSIS SYSTEM WITH VIDEOS CAPTURED FROM ARBITRARY ANGLES AND METHOD THEREOF

RELATED APPLICATIONS

This application claims priority to Taiwan Application Serial Number 111150960, filed Dec. 30, 2022, which is herein incorporated by reference.

BACKGROUND

Technical Field

The present disclosure relates to a real-time basketball box score recording and analysis system and a method thereof. More particularly, the present disclosure relates to an automatic real-time basketball box score recording and analysis system with videos captured from arbitrary angles and a method thereof.

Description of Related Art

Basketball games usually record data in a fully manual manner, but the manual manner is prone to errors or omissions. In recent years, with the development of computer vision and artificial intelligence (AI), such information technologies have been widely employed for game analysis and player training in the field of sports. However, in the field of basketball, there are less existing applications due to the higher difficulty of implementing the technologies. Basketball is a multiplayer team sport which needs to score as much as possible in a limited period of time to win the game. The fast pace of the game and the close contacts of offensive and defensive players lead to heavy camera movements and player occlusions. In such situations, the limited camera view would cause severe information loss, making it a grand challenge to analyze the game with a single view camera. Therefore, most of the existing basketball game analysis solutions are only applied to relatively simple scenarios (e.g., personal shooting training), or are achieved by wearable sensors disposed on the player and the ball. However, the former cannot be applied to an actual game scenario (e.g., processing of videos captured from arbitrary angles and analysis of precise shot status), and the latter needs to purchase additional expensive sensor-receivers. These kinds of sensors are forbidden to attach on the players in formal sport games. Moreover, although AI technology is more efficient than manual labeling, errors may still occur. Therefore, an automatic real-time basketball box score recording and analysis system with videos captured from arbitrary angles and a method thereof which are capable of precisely performing a fine-grained shot status analysis in the videos with arbitrary camera movements, integrating a posture analysis data of the shooter into the fine-grained shot status analysis and achieving automatic score recording are commercially desirable.

SUMMARY

According to one aspect of the present disclosure, an automatic real-time basketball box score recording and analysis system with videos captured from arbitrary angles is applied to a basketball game. The automatic real-time basketball box score recording and analysis system with the videos captured from the arbitrary angles includes at least one camera, a computing device and an interface device. The at least one camera is configured to capture at least one of the videos of the basketball game from one of the arbitrary angles. The computing device is signally connected to the at least one camera and receives the at least one of the videos. The computing device is configured to perform a plurality of steps including a shot analyzing step, a data calculating step and a player analyzing step. The shot analyzing step is performed to analyze the at least one of the videos to determine whether the at least one of the videos is a real shot event to generate a shot analysis result. The data calculating step is performed to analyze the at least one of the videos to determine that the real shot event is a three-point shot, a two-point shot or a free throw to generate a scoring result, and then calculate a game data according to the shot analysis result and the scoring result. The player analyzing step is performed to analyze the at least one of the videos to obtain a posture analysis data of a shooter. The shooter corresponds to the real shot event, and the posture analysis data is configured to evaluate a performance of the shooter when shooting. The interface device is signally connected to the computing device and receives the game data. The interface device is configured to modify and display the game data.

According to another aspect of the present disclosure, an automatic real-time basketball box score recording and analysis method with videos captured from arbitrary angles is applied to a basketball game. The automatic real-time basketball box score recording and analysis method with the videos captured from the arbitrary angles includes performing a data automatic computing step and a data modifying and displaying step. The data automatic computing step includes performing a shot analyzing step, a data calculating step and a player analyzing step. The shot analyzing step is performed to configure a computing device to analyze the at least one of the videos from at least one camera to determine whether the at least one of the videos is a real shot event to generate a shot analysis result. The at least one of the videos of the basketball game is captured by the at least one camera from one of the arbitrary angles. The data calculating step is performed to configure the computing device to analyze the at least one of the videos to determine that the real shot event is a three-point shot, a two-point shot or a free throw to generate a scoring result, and then calculate a game data according to the shot analysis result and the scoring result. The player analyzing step is performed to configure the computing device to analyze the at least one of the videos to obtain a posture analysis data of a shooter. The shooter corresponds to the real shot event, and the posture analysis data is configured to evaluate a performance of the shooter when shooting. The data modifying and displaying step is performed to configure an interface device to modify and display the game data.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details are unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
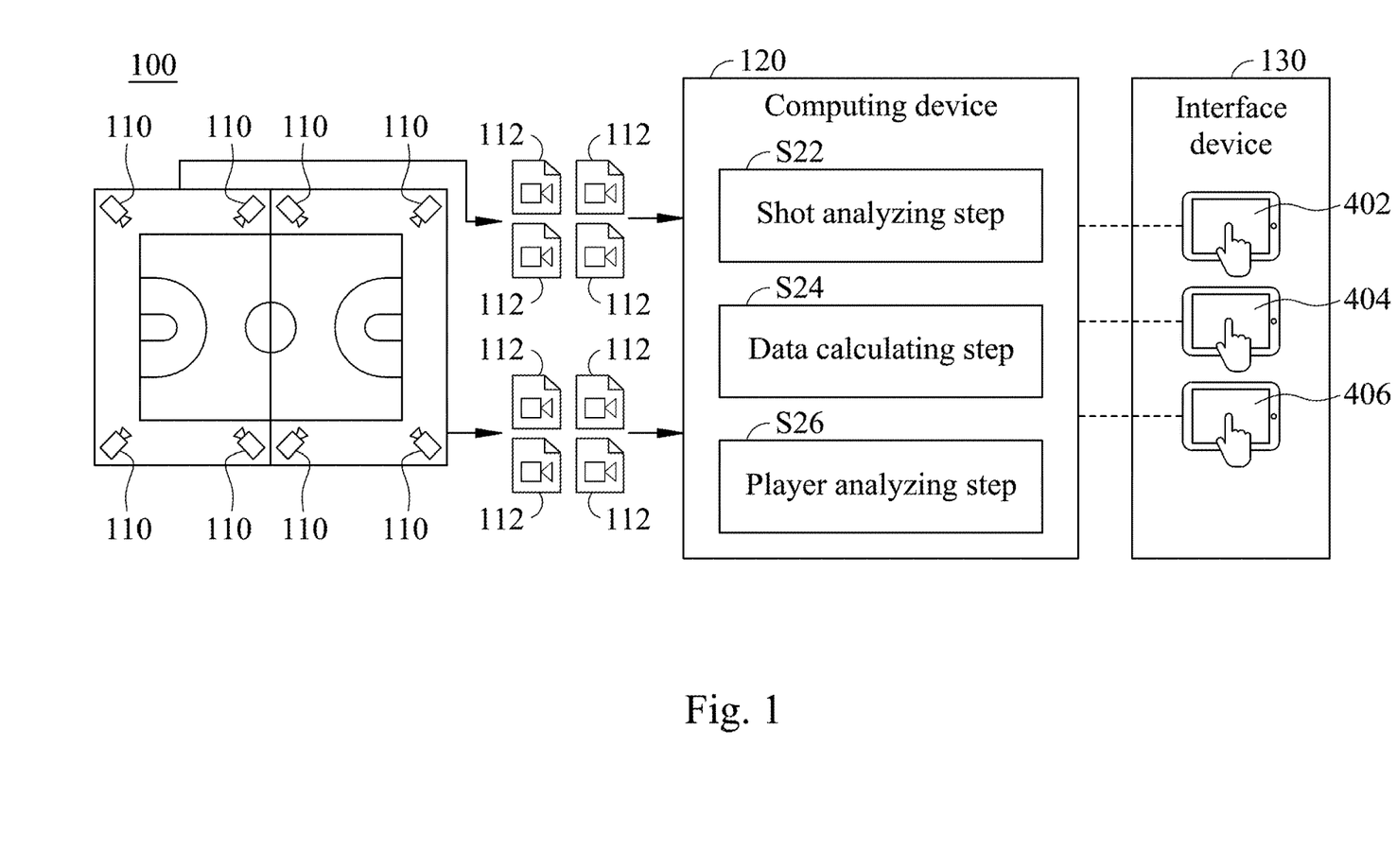
FIG. 1 shows a schematic view of an automatic real-time basketball box score recording and analysis system with videos captured from arbitrary angles according to a first embodiment of the present disclosure.

Reference is made to FIG. 1. FIG. 1 shows a schematic view of an automatic real-time basketball box score recording and analysis system 100 with videos 112 captured from arbitrary angles according to a first embodiment of the present disclosure. The automatic real-time basketball box score recording and analysis system 100 with the videos 112 captured from the arbitrary angles may be applied to a basketball game and includes at least one camera 110, a computing device 120 and an interface device 130. The at least one camera 110 is configured to capture at least one of the videos 112 of the basketball game from one of the arbitrary angles. In other words, the videos 112 can be a frame captured from any angle of view. The computing device 120 is signally connected to the at least one camera 110 and receives the at least one of the videos 112. The computing device 120 is configured to perform a plurality of steps including a shot analyzing step S22, a data calculating step S24 and a player analyzing step S26. The shot analyzing step S22 is performed to analyze the at least one of the videos 112 to determine whether the at least one of the videos 112 is a real shot event to generate a shot analysis result. The data calculating step S24 is performed to analyze the at least one of the videos 112 to determine that the real shot event is a three-point shot, a two-point shot or a free throw to generate a scoring result, and then calculate a game data according to the shot analysis result and the scoring result. The player analyzing step S26 is performed to analyze the at least one of the videos 112 to obtain a posture analysis data of a shooter. The shooter corresponds to the real shot event, and the posture analysis data is configured to evaluate a performance of the shooter when shooting. The interface device 130 is signally connected to the computing device 120 and receives the game data. The interface device 130 is configured to modify and display the game data. Therefore, the automatic real-time basketball box score recording and analysis system 100 with the videos 112 captured from the arbitrary angles of the present disclosure can precisely perform a fine-grained shot status analysis in the videos 112 with arbitrary camera movements via the shot analyzing step S22, the data calculating step S24 and the player analyzing step S26 performed in the computing device 120, and integrate the posture analysis data of the shooter into the fine-grained shot status analysis, thereby obtaining complete and precise real-time game information. Moreover, the computing device 120 can determine whether the score is a free throw, a two-point shot or a three-point shot, thereby achieving automatic score recording. The interface device 130 is configured to view and modify the data from the computing device 120, and the interface device 130 presents a visual data to at least one user.

In one embodiment, the number of the at least one camera 110 and the number of the videos 112 are both eight, and the number of the computing device 120 is one, but the present disclosure is not limited thereto. The computing device 120 can be a computing cluster and includes a computing unit and a memory. The computing unit can be a processor, a central processing unit (CPU), a graphics processing unit (GPU), a computer, a mobile device processor, a cloud processor or other high-performance arithmetic processor which can process the videos 112, but the present disclosure is not limited thereto. The memory may be a random access memory (RAM) or another type of dynamic storage device that stores information, messages and instructions for execution by the computing unit, but the present disclosure is not limited thereto. In addition, the interface device 130 can be a tablet computer, a mobile phone or other mobile device, but the present disclosure is not limited thereto.

Figure 2:
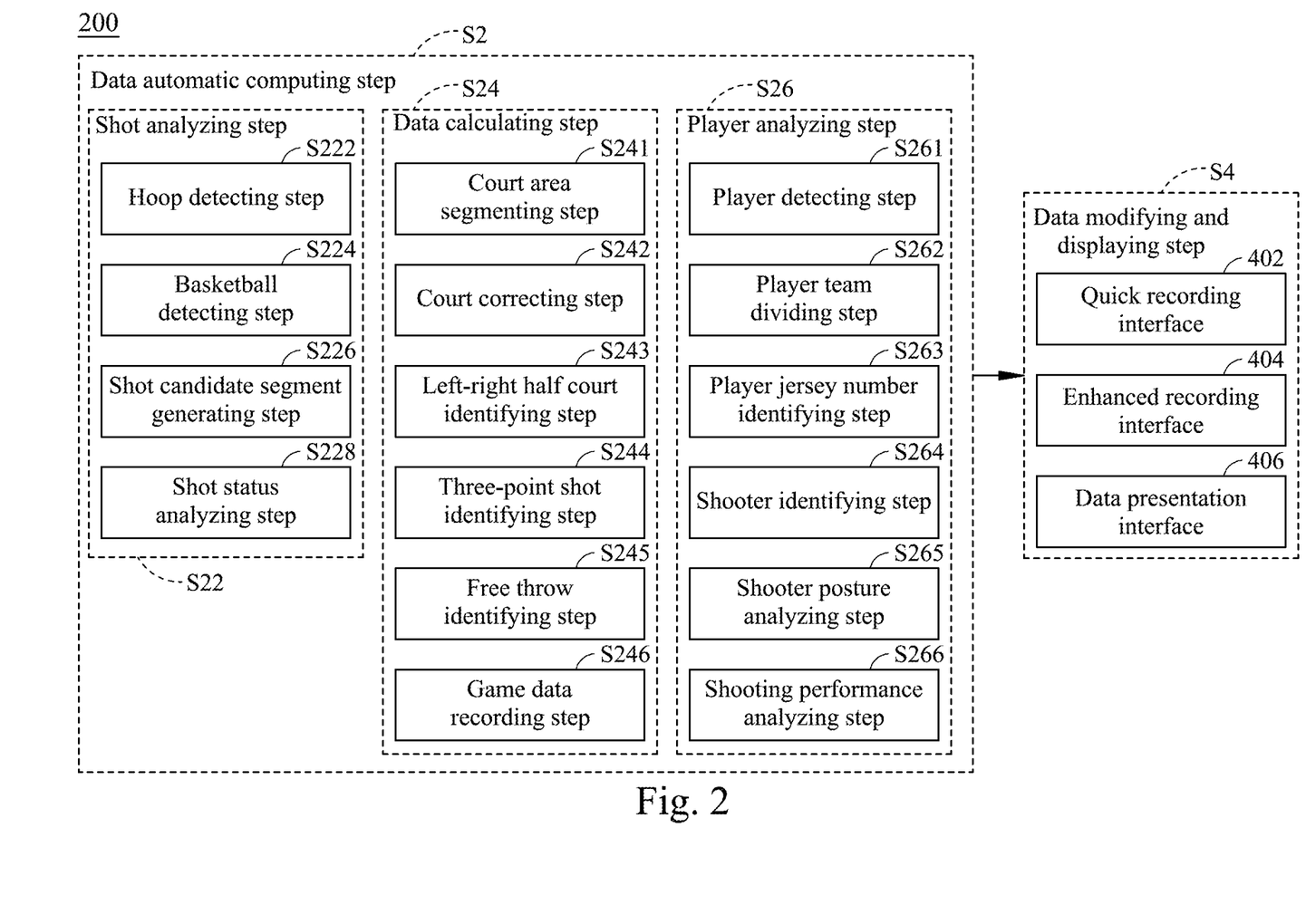
FIG. 2 shows a flow chart of an automatic real-time basketball box score recording and analysis method with videos captured from arbitrary angles according to a second embodiment of the present disclosure.

Reference is made to FIGS. 1 and 2. FIG. 2 shows a flow chart of an automatic real-time basketball box score recording and analysis method 200 with videos 112 captured from arbitrary angles according to a second embodiment of the present disclosure. The automatic real-time basketball box score recording and analysis method 200 with the videos captured from the arbitrary angles may be applied to a basketball game and includes performing a data automatic computing step S2 and a data modifying and displaying step S4. The data automatic computing step S2 includes performing a shot analyzing step S22, a data calculating step S24 and a player analyzing step S26. The shot analyzing step S22 is performed to configure a computing device 120 to analyze the at least one of the videos 112 from at least one camera 110 to determine whether the at least one of the videos 112 is a real shot event to generate a shot analysis result. The at least one of the videos 112 of the basketball game is captured by the at least one camera 110 from one of the arbitrary angles. The data calculating step S24 is performed to configure the computing device 120 to analyze the at least one of the videos 112 to determine that the real shot event is a three-point shot, a two-point shot or a free throw to generate a scoring result, and then calculate a game data according to the shot analysis result and the scoring result. The player analyzing step S26 is performed to configure the computing device 120 to analyze the at least one of the videos 112 to obtain a posture analysis data of a shooter. The shooter corresponds to the real shot event, and the posture analysis data is configured to evaluate a performance of the shooter when shooting. The data modifying and displaying step S4 is performed to configure an interface device 130 to modify and display the game data. Therefore, the automatic real-time basketball box score recording and analysis method 200 with the videos captured from the arbitrary angles of the present disclosure can precisely perform a fine-grained shot status analysis in the videos 112 with arbitrary camera movements via the shot analyzing step S22, the data calculating step S24 and the player analyzing step S26, and integrate the posture analysis data of the shooter into the fine-grained shot status analysis, thereby obtaining complete and precise real-time game information. Moreover, the method of the present disclosure can determine whether the score is a free throw, a two-point shot or a three-point shot, thereby achieving automatic score recording. In the data modifying and displaying step S4, the interface device 130 is configured to view and modify the data from the computing device 120, and the interface device 130 presents a visual data to at least one user.

Figure 3:
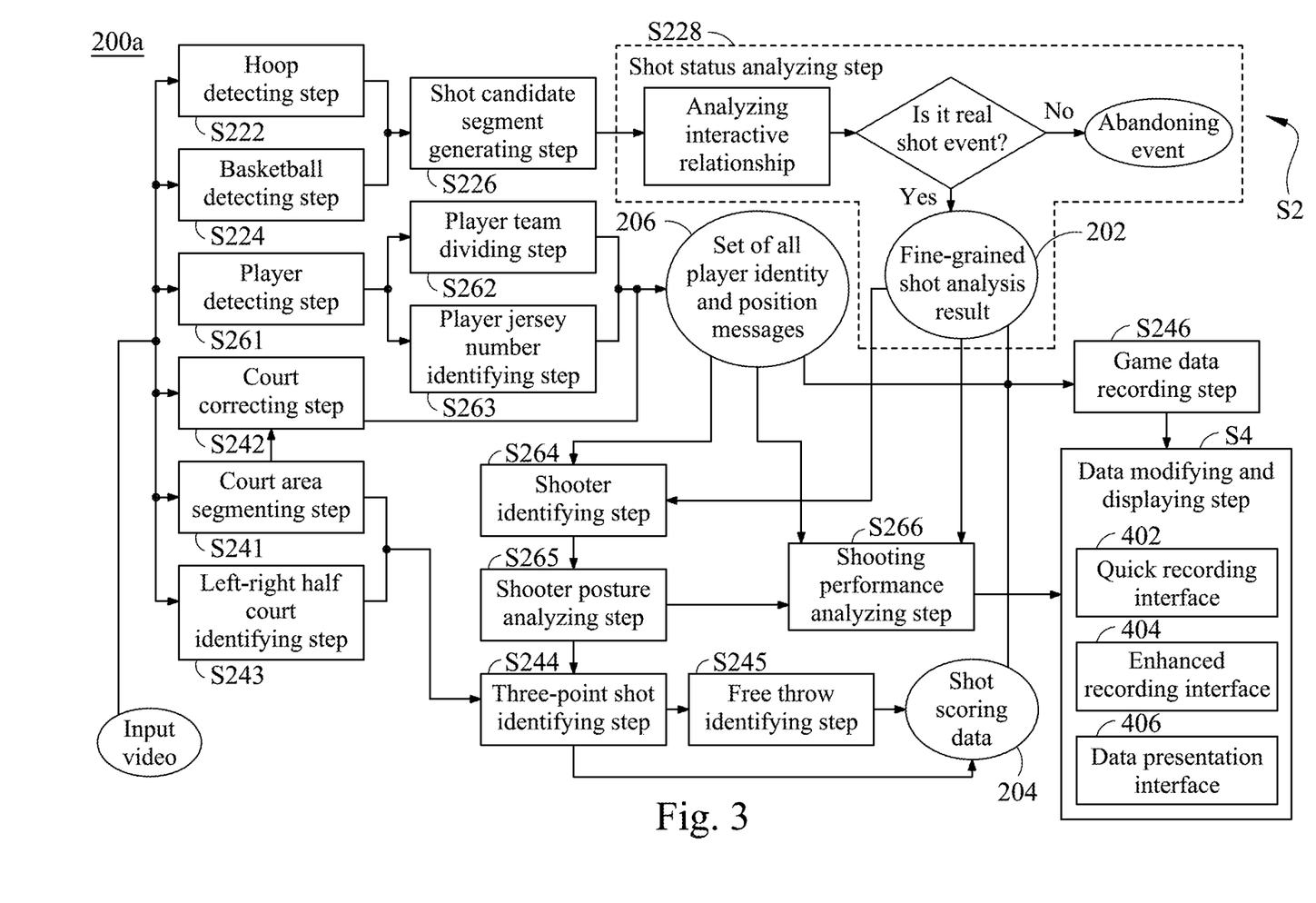
FIG. 3 shows a flow chart of an automatic real-time basketball box score recording and analysis method with videos captured from arbitrary angles according to a third embodiment of the present disclosure.
Figure 4:
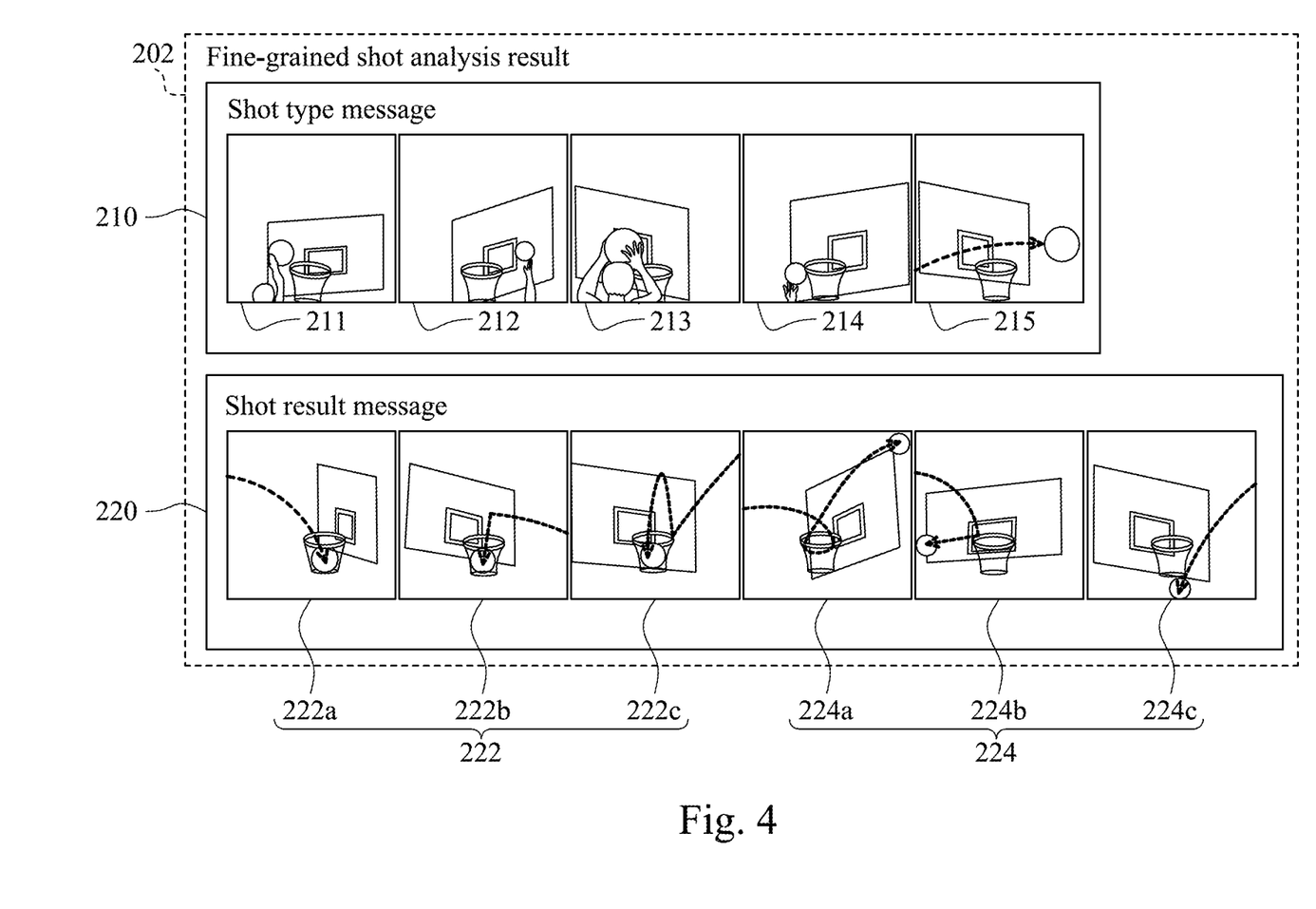
FIG. 4 shows a schematic view of a fine-grained shot analysis result of a shot status analyzing step of FIG. 3.

Reference is made to FIGS. 1, 2, 3 and 4. FIG. 3 shows a flow chart of an automatic real-time basketball box score recording and analysis method 200a with videos 112 captured from arbitrary angles according to a third embodiment of the present disclosure. FIG. 4 shows a schematic view of a fine-grained shot analysis result 202 of a shot status analyzing step S228 of FIG. 3. The automatic real-time basketball box score recording and analysis method 200a with the videos 112 captured from the arbitrary angles may be applied to a basketball game and includes performing a data automatic computing step S2 and a data modifying and displaying step S4. The data automatic computing step S2 includes performing a shot analyzing step S22, a data calculating step S24 and a player analyzing step S26.

The shot analyzing step S22 is performed to configure a computing device 120 to analyze the at least one of the videos 112 from at least one camera 110 to determine whether the at least one of the videos 112 is a real shot event to generate a shot analysis result. The at least one of the videos 112 of the basketball game is captured by the at least one camera 110 from one of the arbitrary angles. In detail, the at least one of the videos 112 includes a plurality of frames. The shot analyzing step S22 includes performing a hoop detecting step S222, a basketball detecting step S224, a shot candidate segment generating step S226 and a shot status analyzing step S228.

The hoop detecting step S222 is performed to detect a hoop position of a hoop in each of the frames. The basketball detecting step S224 is performed to detect a basketball position of a basketball in each of the frames. The hoop position and the basketball position are configured to generate a shot candidate event. The shot candidate segment generating step S226 is performed to generate the shot candidate event by cutting and segmenting a video area around the hoop according to the hoop position and the basketball position. The shot status analyzing step S228 is performed to calculate an interactive relationship between the basketball and the hoop via a deep neural network model, and analyze the interactive relationship to determine whether the shot candidate event is the real shot event to generate the shot analysis result. In response to determining that the basketball is located around the hoop, the hoop detecting step S222, the basketball detecting step S224, the shot candidate segment generating step S226 and the shot status analyzing step S228 are performed. In response to determining that the basketball is not located around the hoop, the hoop detecting step S222 and the basketball detecting step S224 are performed, i.e., the shot candidate segment generating step S226 and the shot status analyzing step S228 are not performed.

As seen from the above, the shot status analyzing step S228 analyzes a spatio-temporal correlation between the basketball and the hoop to generate the shot analysis result. In addition, in the shot status analyzing step S228, in response to determining that the shot analysis result is yes, a fine-grained shot status analysis is performed to obtain a fine-grained shot analysis result 202. The fine-grained shot analysis result 202 includes a shot type message 210, a shot result message 220 and a shot event occurrence time. The shot type message 210 is one of a dunk message 211, a layup message 212, a shoot message 213, a tip-in message 214 and a non-shooting message 215 (e.g., a pass message). The shot result message 220 is one of a score message 222 and a miss message 224. The score message 222 is one of a swish message 222a, a bank shot message 222b and a bounce shot message 222c, and the miss message 224 is one of an in and out message 224a, a brick message 224b and an air ball message 224c, as shown in FIG. 4. The shot event occurrence time represents an occurrence time of a shot event corresponding to the shot type message 210 and the shot result message 220. In addition, in the shot status analyzing step S228, in response to determining that the shot analysis result is no, the shot candidate event is determined as an abandoning event (i.e., a non-real shot).

The data calculating step S24 is performed to analyze the at least one of the videos 112 to determine that the real shot event is a three-point shot, a two-point shot or a free throw to generate a scoring result, and then calculate a game data according to the shot analysis result and the scoring result. In detail, the data calculating step S24 includes performing a court area segmenting step S241, a court correcting step S242, a left-right half court identifying step S243, a three-point shot identifying step S244 and a free throw identifying step S245.

The court area segmenting step S241 is performed to segment a court area in the at least one of the videos 112 into a restricted region, a two-point region, a three-point region and an outside region by using a deep neural network model to generate a court area message. The court correcting step S242 is performed to correct the court area message to generate an area correction message. The area correction message includes a two-dimensional area message, and the two-dimensional area message corresponds to the court area. The left-right half court identifying step S243 is performed to identify that the at least one of the videos 112 belongs to a left half court or a right half court to generate a left-right half court message so as to distinguish the real shot event of two teams. The three-point shot identifying step S244 is performed to determine whether the real shot event is the three-point shot by using the court area message, the left-right half court message and the posture analysis data to generate a three-point shot identification result. The posture analysis data includes a location of a foot joint of the shooter. The free throw identifying step S245 is performed to analyze a distribution of a plurality of players in the court area by using the deep neural network model, and identify whether the real shot event is the free throw according to the distribution to generate a free throw identification result. In response to determining that the three-point shot identification result is yes, the data calculating step S24 further includes generating a shot scoring data 204, and the shot scoring data 204 is 3 points. In response to determining that the three-point shot identification result is no, and the free throw identification result is yes, the data calculating step S24 further includes generating the shot scoring data 204, and the shot scoring data 204 is 1 point. In response to determining that the three-point shot identification result is no, and the free throw identification result is no, the data calculating step S24 further includes generating the shot scoring data 204, and the shot scoring data 204 is 2 points.

The player analyzing step S26 is performed to analyze the at least one of the videos 112 to obtain a posture analysis data of a shooter. The shooter corresponds to the real shot event, and the posture analysis data is configured to evaluate a performance of the shooter when shooting. In detail, the player analyzing step S26 includes a player detecting step S261, a player team dividing step S262, a player jersey number identifying step S263, a shooter identifying step S264, a shooter posture analyzing step S265 and a shooting performance analyzing step S266.

The player detecting step S261 is performed to detect a plurality of positions of a plurality of players in the at least one of the videos 112 to generate a plurality of player position messages corresponding to the players. The player team dividing step S262 is performed to analyze a team of each of the players in the at least one of the videos 112 to generate a plurality of team identity messages corresponding to the players. The player jersey number identifying step S263 is performed to identify a jersey number of each of the players in the at least one of the videos 112 to generate a plurality of player jersey number messages corresponding to the players. The player position messages, the team identity messages and the player jersey number messages are formed to a set 206 of all player identity and position messages, and the set 206 of all player identity and position messages is divided into an offensive team message and a defensive team message. In addition, the shooter identifying step S264 is performed to identify the shooter in the at least one of the videos 112 and generate a shooter message according to the shot analysis result. Specifically, the shooter identifying step S264 is performed to find out a core player who takes the shot according to the offensive team message of the set 206 of all player identity and position messages and the shot event occurrence time of the fine-grained shot analysis result 202. The shooter is one of the players and corresponds to the offensive team message. The shooter posture analyzing step S265 is performed to analyze a posture of the shooter when shooting in the at least one of the videos 112 to generate the posture analysis data. The posture analysis data includes a skeleton message of the shooter, a joint angle of each of a plurality of joints and a displacement. The shooting performance analyzing step S266 is performed to analyze the shot analysis result, the defensive team message and the posture analysis data to generate a shooting performance message of the shooter. The shooting performance message corresponds to the performance of the shooter when shooting. In detail, the shooting performance analyzing step S266 can evaluate whether there are differences performances of the shooter in different states (e.g., the identity of the defensive player, the distance between the shooter and the defensive player) or at different times according to the fine-grained shot analysis result 202, the defensive team message and the posture analysis data, thereby providing more diverse data analysis results.

The data calculating step S24 further includes performing a game data recording step S246. The game data recording step S246 is performed to integrate the shot analysis result of the shot analyzing step S22 with the set 206 of all player identity and position messages of the player analyzing step S26 and the shot scoring data 204 of the data calculating step S24 to generate the game data. In detail, in response to determining that the shot analysis result is yes, the game data recording step S246 is performed to integrate the fine-grained shot analysis result 202 of the shot analyzing step S22 with the set 206 of all player identity and position messages of the player analyzing step S26 and the shot scoring data 204 of the data calculating step S24 to generate the game data.

The data modifying and displaying step S4 is performed to configure an interface device 130 to modify and display the game data. In detail, in the data modifying and displaying step S4, the interface device 130 receives the shooting performance message and the game data. The interface device 130 is configured to view and modify the shooting performance message and the game data, and the interface device presents a visual data to at least one user. The data modifying and displaying step S4 mainly utilizes the interface device 130 (e.g., a tablet computer) as an interface carrier. After obtaining calculation data results of each step in the computing device 120 through an application programming interface (API), the interface device 130 utilizes a quick recording interface 402, an enhanced recording interface 404 and a data presentation interface 406 to provide a complete labeling process and data visualization in real time. In other words, three-stage labeling of the quick recording interface 402, the enhanced recording interface 404 and the data presentation interface 406 can accomplish quick correction, supplement label information and display the statistical game data, and can manage and maintain data via the database to output data by an authority user for other applications in real time.

Therefore, the automatic real-time basketball box score recording and analysis method 200a with the videos 112 captured from the arbitrary angles of the present disclosure can utilize the shot analyzing step S22 to analyze the frames captured by different cameras 110 (e.g., a handheld camera, a fixed camera or a broadcasting camera) in combination with any type (e.g., arbitrary camera movements or a fixed position), and additionally determine more detailed shot events. In addition, the present disclosure can utilize the player analyzing step S26 to obtain the team message of the players, the player jersey numbers of the players and the position messages of the players, and find out the core player who takes the shot, thereby obtaining the relevant shooter message. Moreover, the present disclosure can utilize the data calculating step S24 to determine that the real shot event is the three-point shot, the two-point shot or the free throw. The real shot event may be linked to the target team and the player, thereby achieving automatic score recording.

Figure 5:
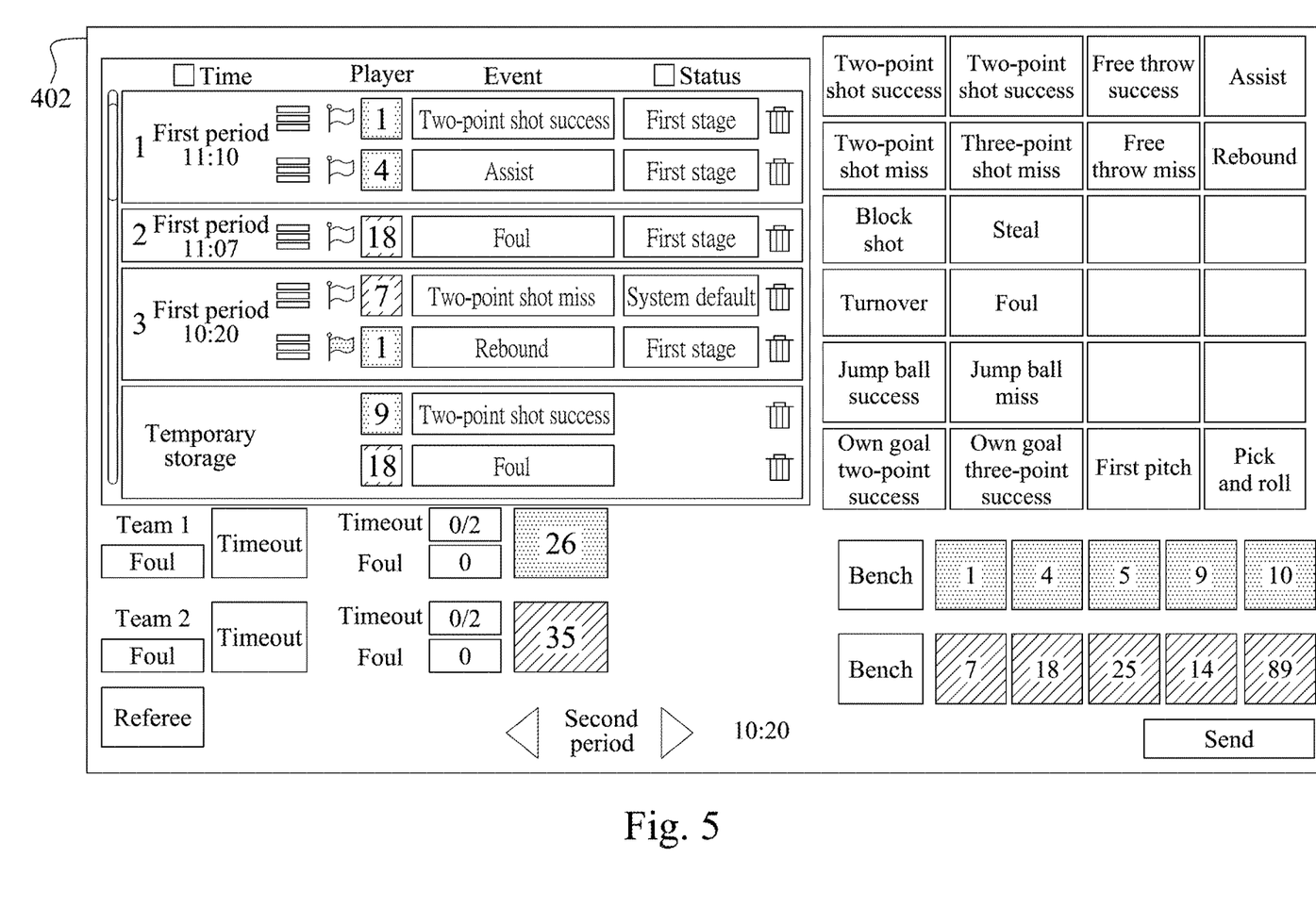
FIG. 5 shows a schematic view of a quick recording interface of the present disclosure.
Figure 6:
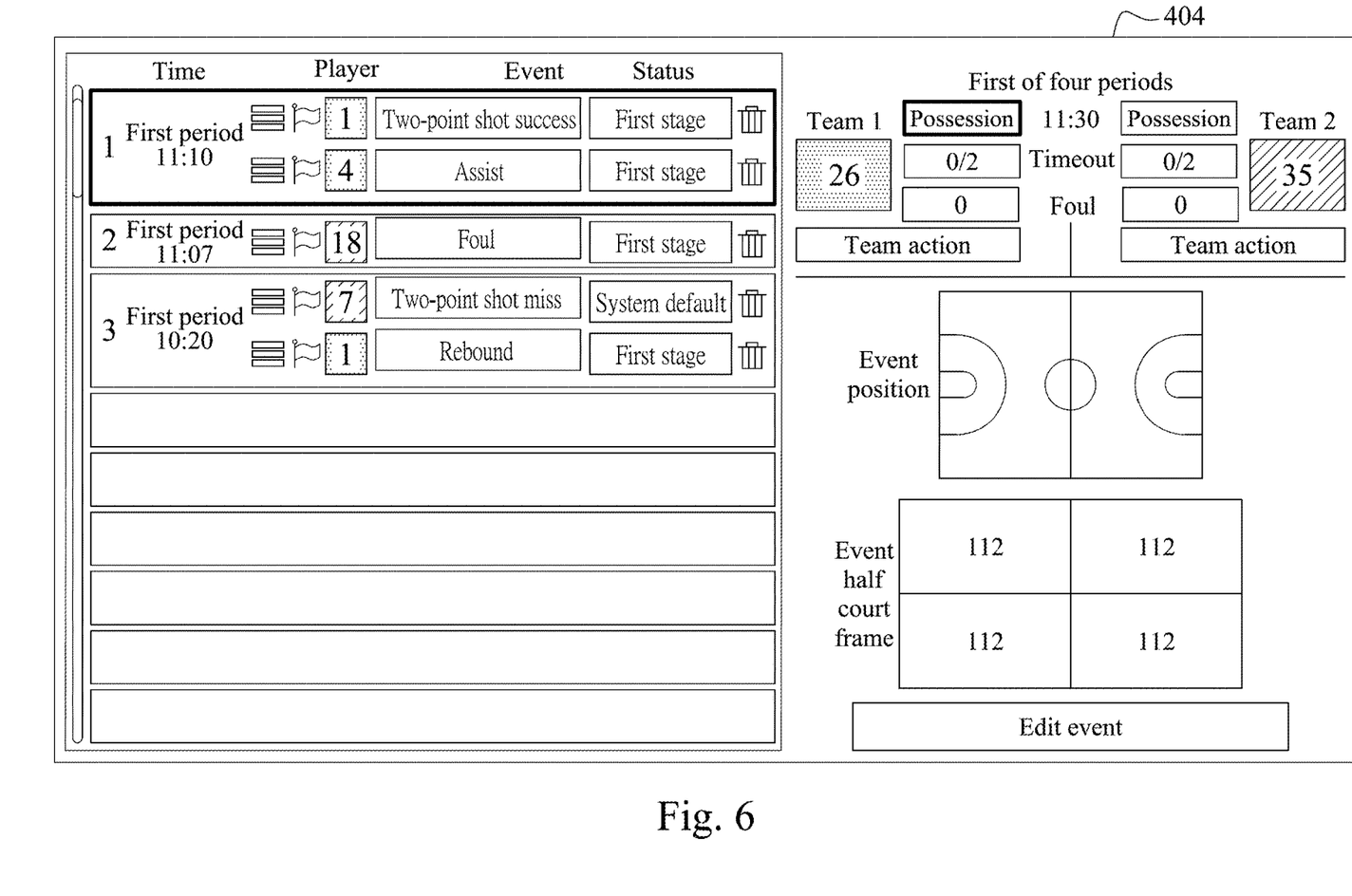
FIG. 6 shows a schematic view of an enhanced recording interface of the present disclosure.
Figure 7:
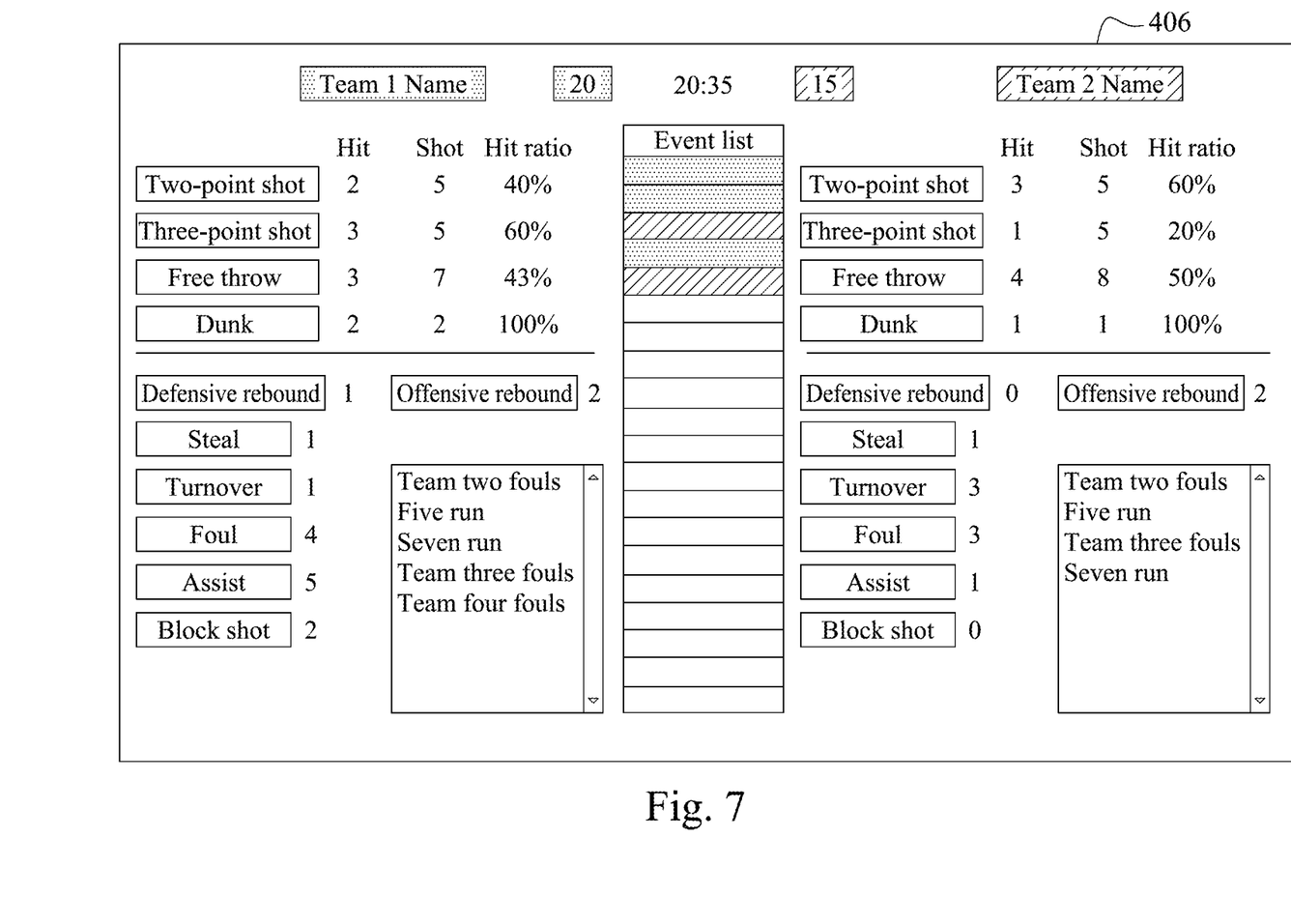
FIG. 7 shows a schematic view of a data presentation interface of the present disclosure.

Reference is made to FIGS. 1, 2, 3, 5, 6 and 7. FIG. 5 shows a schematic view of a quick recording interface 402 of the present disclosure. FIG. 6 shows a schematic view of an enhanced recording interface 404 of the present disclosure. FIG. 7 shows a schematic view of a data presentation interface 406 of the present disclosure. The interface device 130 and the data modifying and displaying step S4 of the present disclosure utilize the quick recording interface 402, the enhanced recording interface 404 and the data presentation interface 406 for the user to view and modify the data outputted by the system.

The quick recording interface 402 is mainly utilized for a first recorder located on the outside of the basketball court to immediately confirm or modify the output results of the data automatic computing step S2. The purpose of the quick recording interface 402 is to complete preliminary labeling of all events in real time, and the details are handed over to a second recorder. In detail, the quick recording interface 402 mainly compiles the events on the basketball court identified by the computing device 120 into a list, and then enables event tags predicted by the system to be quickly manually corrected. Moreover, the quick recording interface 402 displays event-related messages which include a list of all events in the current basketball game, a score of the two teams, a message of players on the basketball court, the number of fouls and the number of remaining timeouts. For the events, each of the events can be selected in the list to edit the content (including the player and the event corresponding to the player) or add a new event directly. For the teams (Team 1 and Team 2), because the coaching team may perform the action of timeout or replacing players (benches) during the game process, the recording function of the teams is planned into the quick recording interface 402. The above data may be synchronized to the enhanced recording interface 404 and the data presentation interface 406. In one embodiment, the event tags can include "two-point shot success", "three-point shot success", "free throw success", "assist", "two-point shot miss", "three-point shot miss", "free throw miss", "rebound", "block shot", "steal", "turnover", "foul", "jump ball success", "jump ball miss", "own goal two-point success", "own goal three-point success", "first pitch" and "pick and roll", but the present disclosure is not limited thereto.

The enhanced recording interface 404 mainly replays the game clips captured from multiple angles at the time point of the event, and is utilized for a second recorder to label in more detail, and recheck or modify the events labeled in the quick recording interface 402 at the same time. In detail, the enhanced recording interface 404 is utilized for the user (i.e., the second recorder) to confirm whether the event is misjudged by replaying the frames captured from multiple angles. In addition, the enhanced recording interface 404 can be utilized to simultaneously confirm the advanced data and the calculation results of the object and player tracking, so that the final data correction is performed in real time.

After labeling and confirming by the first recorder and the second recorder, all the labeled or calculated data may be visualized in the data presentation interface 406 together. The visual data includes team information of the two teams, a score and a hit ratio of each player, shot types, shot positions and other game-related information (e.g., the number of fouls, run). The data presentation interface 406 collects and visualizes all the data, thereby facilitating an external cooperation unit to obtain real-time information of the game more quickly. In addition to the table form commonly used in existing basketball game for presenting the data of each player, the present disclosure plans a data visualization interface for a sportscaster to more clearly present important data trends of the two teams, thereby providing more information which can be used by the sportscaster and additional value to broadcast.

The automatic real-time basketball box score recording and analysis methods 200, 200a with the videos 112 captured from the arbitrary angles of the present disclosure can be widely applied in various types (single shot, one-on-one, three-on-three or five-on-five) of the basketball game or player training, and can also be used to edit the highlight of the basketball game. In addition, the automatic real-time basketball box score recording and analysis methods 200, 200a with the videos 112 captured from the arbitrary angles can be implemented by a computer program product. A computer program of the present disclosure stored on a non-transitory tangible computer readable recording medium is used to perform the automatic real-time basketball box score recording and analysis methods 200, 200a with the videos 112 captured from the arbitrary angles. The aforementioned embodiments can be provided as a computer program product, which may include a machine-readable medium on which instructions are stored for programming a computer (or other electronic devices) to perform the steps based on the embodiments of the present disclosure. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present disclosure also can be downloaded as a computer program product, which may be transferred from a remote computer to a requesting computer by using data signals via a communication link (such as a network connection or the like).

According to the aforementioned embodiments and examples, the advantages of the present disclosure are described as follows.

1. The automatic real-time basketball box score recording and analysis system with the videos captured from the arbitrary angles and the method thereof of the present disclosure can utilize the shot analyzing step to analyze the frames captured by different cameras in combination with any type, and additionally determine more detailed shot events, thereby solving the problem that a conventional analysis system cannot be applied to the actual game scenario.

2. The automatic real-time basketball box score recording and analysis system with the videos captured from the arbitrary angles and the method thereof of the present disclosure can utilize the player analyzing step to obtain the team message of the players, the player jersey numbers of the players and the position messages of the players, and find out the core player who takes the shot, thereby obtaining the relevant shooter message.

3. The automatic real-time basketball box score recording and analysis system with the videos captured from the arbitrary angles and the method thereof of the present disclosure can utilize the data calculating step to determine that the real shot event is the three-point shot, the two-point shot or the free throw. The real shot event may be linked to the target team and the player, thereby achieving automatic score recording.

4. The automatic real-time basketball box score recording and analysis system with the videos captured from the arbitrary angles and the method thereof of the present disclosure can utilize the interface device and the data modifying and displaying step in combination with the three-stage labeling of the quick recording interface, the enhanced recording interface and the data presentation interface to accomplish quick correction, supplement label information and display the statistical game data. In addition, the present disclosure can manage and maintain data via the database to output data by an authority user for other applications in real time, thereby solving the problem that a conventional AI technology has errors.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An automatic real-time basketball box score recording and analysis system with videos captured from arbitrary angles, which is applied to a basketball game, and the automatic real-time basketball box score recording and analysis system with the videos captured from the arbitrary angles comprising:
- at least one camera configured to capture at least one of the videos of the basketball game from one of the arbitrary angles;
- a computing device signally connected to the at least one camera and receives the at least one of the videos, wherein the computing device is configured to perform a plurality of steps comprising:
  - a shot analyzing step performed to analyze the at least one of the videos to determine whether the at least one of the videos is a real shot event to generate a shot analysis result;
  - a data calculating step performed to analyze the at least one of the videos to determine that the real shot event is a three-point shot, a two-point shot or a free throw to generate a scoring result, and then calculate a game data according to the shot analysis result and the scoring result; and
  - a player analyzing step performed to analyze the at least one of the videos to obtain a posture analysis data of a shooter, wherein the shooter corresponds to the real shot event, and the posture analysis data is configured to evaluate a performance of the shooter when shooting; and
- an interface device signally connected to the computing device and receiving the game data, wherein the interface device is configured to modify and display the game data;
- wherein the interface device utilizes a quick recording interface, an enhanced recording interface and a data presentation interface to provide a complete labeling process and data visualization in real time, and the quick recording interface, the enhanced recording interface and the data presentation interface are different from each other;
- wherein the player analyzing step comprises:
  - performing a player detecting step to detect a plurality of positions of a plurality of players in the at least one of the videos to generate a plurality of player position messages corresponding to the players;
  - performing a player team dividing step to analyze a team of each of the players in the at least one of the videos to generate a plurality of team identity messages corresponding to the players; and
  - performing a player jersey number identifying step to identify a jersey number of each of the players in the at least one of the videos to generate a plurality of player jersey number messages corresponding to the players;
- wherein the player position messages, the team identity messages and the player jersey number messages are formed to a set of all player identity and position messages, and the set of all player identity and position messages is divided into an offensive team message and a defensive team message.

2. The automatic real-time basketball box score recording and analysis system with the videos captured from the arbitrary angles of claim 1, wherein the at least one of the videos comprises a plurality of frames, and the shot analyzing step comprises:
- performing a hoop detecting step to detect a hoop position of a hoop in each of the frames; and
- performing a basketball detecting step to detect a basketball position of a basketball in each of the frames;
- wherein the hoop position and the basketball position are configured to generate a shot candidate event.

3. The automatic real-time basketball box score recording and analysis system with the videos captured from the arbitrary angles of claim 2, wherein the shot analyzing step further comprises:
- performing a shot candidate segment generating step to generate the shot candidate event by cutting and segmenting a video area around the hoop according to the hoop position and the basketball position; and
- performing a shot status analyzing step to calculate an interactive relationship between the basketball and the hoop via a deep neural network model, and analyze the interactive relationship to determine whether the shot candidate event is the real shot event to generate the shot analysis result;
- wherein in response to determining that the basketball is located around the hoop, the hoop detecting step, the basketball detecting step, the shot candidate segment generating step and the shot status analyzing step are performed;
- wherein in response to determining that the basketball is not located around the hoop, the hoop detecting step and the basketball detecting step are performed.

4. The automatic real-time basketball box score recording and analysis system with the videos captured from the arbitrary angles of claim 3, wherein in the shot status analyzing step, in response to determining that the shot analysis result is yes, a fine-grained shot status analysis is performed to obtain a shot type message and a shot result message, the shot type message is one of a dunk message, a layup message, a shoot message and a tip-in message, the shot result message is one of a score message and a miss message, the score message is one of a swish message, a bank shot message and a bounce shot message, and the miss message is one of an in and out message, a brick message and an air ball message.

5. The automatic real-time basketball box score recording and analysis system with the videos captured from the arbitrary angles of claim 1, wherein the player analyzing step further comprises:
- performing a shooter identifying step to identify the shooter in the at least one of the videos and generate a shooter message according to the shot analysis result, wherein the shooter is one of the players and corresponds to the offensive team message;
- performing a shooter posture analyzing step to analyze a posture of the shooter when shooting in the at least one of the videos to generate the posture analysis data, wherein the posture analysis data comprises a skeleton message of the shooter; and
- performing a shooting performance analyzing step to analyze the shot analysis result, the defensive team message and the posture analysis data to generate a shooting performance message of the shooter, wherein the shooting performance message corresponds to the performance of the shooter when shooting.

6. The automatic real-time basketball box score recording and analysis system with the videos captured from the arbitrary angles of claim 1, wherein the data calculating step comprises:
  performing a court area segmenting step to segment a court area in the at least one of the videos into a restricted region, a two-point region, a three-point region and an outside region by using a deep neural network model to generate a court area message;
  performing a court correcting step to correct the court area message to generate an area correction message, wherein the area correction message comprises a two-dimensional area message, and the two-dimensional area message corresponds to the court area; and
  performing a left-right half court identifying step to identify that the at least one of the videos belongs to a left half court or a right half court to generate a left-right half court message so as to distinguish the real shot event of two teams.

7. The automatic real-time basketball box score recording and analysis system with the videos captured from the arbitrary angles of claim 6, wherein the data calculating step further comprises:
  performing a three-point shot identifying step to determine whether the real shot event is the three-point shot by using the court area message, the left-right half court message and the posture analysis data to generate a three-point shot identification result, wherein the posture analysis data comprises a location of a foot joint of the shooter; and
  performing a free throw identifying step to analyze a distribution of a plurality of players in the court area by using the deep neural network model, and identify whether the real shot event is the free throw according to the distribution to generate a free throw identification result;
  wherein in response to determining that the three-point shot identification result is yes, the data calculating step further comprises generating a shot scoring data, and the shot scoring data is 3 points;
  wherein in response to determining that the three-point shot identification result is no, and the free throw identification result is yes, the data calculating step further comprises generating the shot scoring data, and the shot scoring data is 1 point;
  wherein in response to determining that the three-point shot identification result is no, and the free throw identification result is no, the data calculating step further comprises generating the shot scoring data, and the shot scoring data is 2 points.

8. The automatic real-time basketball box score recording and analysis system with the videos captured from the arbitrary angles of claim 7, wherein the data calculating step further comprises:
  performing a game data recording step to integrate the shot analysis result of the shot analyzing step with a set of all player identity and position messages of the player analyzing step and the shot scoring data of the data calculating step to generate the game data.

9. The automatic real-time basketball box score recording and analysis system with the videos captured from the arbitrary angles of claim 8, wherein the interface device receives a shooting performance message and the game data, the interface device is configured to view and modify the shooting performance message and the game data, and the interface device presents a visual data to at least one user.

10. An automatic real-time basketball box score recording and analysis method with videos captured from arbitrary angles, which is applied to a basketball game, and the automatic real-time basketball box score recording and analysis method with the videos captured from the arbitrary angles comprising:
  performing a data automatic computing step, wherein the data automatic computing step comprises:
    performing a shot analyzing step to configure a computing device to analyze the at least one of the videos from at least one camera to determine whether the at least one of the videos is a real shot event to generate a shot analysis result, wherein the at least one of the videos of the basketball game is captured by the at least one camera from one of the arbitrary angles;
    performing a data calculating step to configure the computing device to analyze the at least one of the videos to determine that the real shot event is a three-point shot, a two-point shot or a free throw to generate a scoring result, and then calculate a game data according to the shot analysis result and the scoring result; and
    performing a player analyzing step to configure the computing device to analyze the at least one of the videos to obtain a posture analysis data of a shooter, wherein the shooter corresponds to the real shot event, and the posture analysis data is configured to evaluate a performance of the shooter when shooting; and
  performing a data modifying and displaying step to configure an interface device to modify and display the game data;
  wherein the interface device utilizes a quick recording interface, an enhanced recording interface and a data presentation interface to provide a complete labeling process and data visualization in real time, and the quick recording interface, the enhanced recording interface and the data presentation interface are different from each other;
  wherein the player analyzing step comprises:
    performing a player detecting step to detect a plurality of positions of a plurality of players in the at least one of the videos to generate a plurality of player position messages corresponding to the players;
    performing a player team dividing step to analyze a team of each of the players in the at least one of the videos to generate a plurality of team identity messages corresponding to the players; and
    performing a player jersey number identifying step to identify a jersey number of each of the players in the at least one of the videos to generate a plurality of player jersey number messages corresponding to the players;
  wherein the player position messages, the team identity messages and the player jersey number messages are formed to a set of all player identity and position messages, and the set of all player identity and position messages is divided into an offensive team message and a defensive team message.

11. The automatic real-time basketball box score recording and analysis method with the videos captured from the arbitrary angles of claim 10, wherein the at least one of the videos comprises a plurality of frames, and the shot analyzing step comprises:
  performing a hoop detecting step to detect a hoop position of a hoop in each of the frames; and performing a basketball detecting step to detect a basketball position of a basketball in each of the frames;
wherein the hoop position and the basketball position are configured to generate a shot candidate event.

12. The automatic real-time basketball box score recording and analysis method with the videos captured from the arbitrary angles of claim 11, wherein the shot analyzing step further comprises:
performing a shot candidate segment generating step to generate the shot candidate event by cutting and segmenting a video area around the hoop according to the hoop position and the basketball position; and
performing a shot status analyzing step to calculate an interactive relationship between the basketball and the hoop via a deep neural network model, and analyze the interactive relationship to determine whether the shot candidate event is the real shot event to generate the shot analysis result;
wherein in response to determining that the basketball is located around the hoop, the hoop detecting step, the basketball detecting step, the shot candidate segment generating step and the shot status analyzing step are performed;
wherein in response to determining that the basketball is not located around the hoop, the hoop detecting step and the basketball detecting step are performed.

13. The automatic real-time basketball box score recording and analysis method with the videos captured from the arbitrary angles of claim 12, wherein in the shot status analyzing step, in response to determining that the shot analysis result is yes, a fine-grained shot status analysis is performed to obtain a shot type message and a shot result message, the shot type message is one of a dunk message, a layup message, a shoot message and a tip-in message, the shot result message is one of a score message and a miss message, the score message is one of a swish message, a bank shot message and a bounce shot message, and the miss message is one of an in and out message, a brick message and an air ball message.

14. The automatic real-time basketball box score recording and analysis method with the videos captured from the arbitrary angles of claim 10, wherein the player analyzing step further comprises:
performing a shooter identifying step to identify the shooter in the at least one of the videos and generate a shooter message according to the shot analysis result, wherein the shooter is one of the players and corresponds to the offensive team message;
performing a shooter posture analyzing step to analyze a posture of the shooter when shooting in the at least one of the videos to generate the posture analysis data, wherein the posture analysis data comprises a skeleton message of the shooter; and
performing a shooting performance analyzing step to analyze the shot analysis result, the defensive team message and the posture analysis data to generate a shooting performance message of the shooter, wherein the shooting performance message corresponds to the performance of the shooter when shooting.

15. The automatic real-time basketball box score recording and analysis method with the videos captured from the arbitrary angles of claim 10, wherein the data calculating step comprises:
performing a court area segmenting step to segment a court area in the at least one of the videos into a restricted region, a two-point region, a three-point region and an outside region by using a deep neural network model to generate a court area message;
performing a court correcting step to correct the court area message to generate an area correction message, wherein the area correction message comprises a two-dimensional area message, and the two-dimensional area message corresponds to the court area; and
performing a left-right half court identifying step to identify that the at least one of the videos belongs to a left half court or a right half court to generate a left-right half court message so as to distinguish the real shot event of two teams.

16. The automatic real-time basketball box score recording and analysis method with the videos captured from the arbitrary angles of claim 15, wherein the data calculating step further comprises:
performing a three-point shot identifying step to determine whether the real shot event is the three-point shot by using the court area message, the left-right half court message and the posture analysis data to generate a three-point shot identification result, wherein the posture analysis data comprises a location of a foot joint of the shooter; and
performing a free throw identifying step to analyze a distribution of a plurality of players in the court area by using the deep neural network model, and identify whether the real shot event is the free throw according to the distribution to generate a free throw identification result;
wherein in response to determining that the three-point shot identification result is yes, the data calculating step further comprises generating a shot scoring data, and the shot scoring data is 3 points;
wherein in response to determining that the three-point shot identification result is no, and the free throw identification result is yes, the data calculating step further comprises generating the shot scoring data, and the shot scoring data is 1 point;
wherein in response to determining that the three-point shot identification result is no, and the free throw identification result is no, the data calculating step further comprises generating the shot scoring data, and the shot scoring data is 2 points.

17. The automatic real-time basketball box score recording and analysis method with the videos captured from the arbitrary angles of claim 16, wherein the data calculating step further comprises:
performing a game data recording step to integrate the shot analysis result of the shot analyzing step with a set of all player identity and position messages of the player analyzing step and the shot scoring data of the data calculating step to generate the game data.

18. The automatic real-time basketball box score recording and analysis method with the videos captured from the arbitrary angles of claim 17, wherein in the data modifying and displaying step, the interface device receives a shooting performance message and the game data, the interface device is configured to view and modify the shooting performance message and the game data, and the interface device presents a visual data to at least one user.

* * * * *